Figure 1:
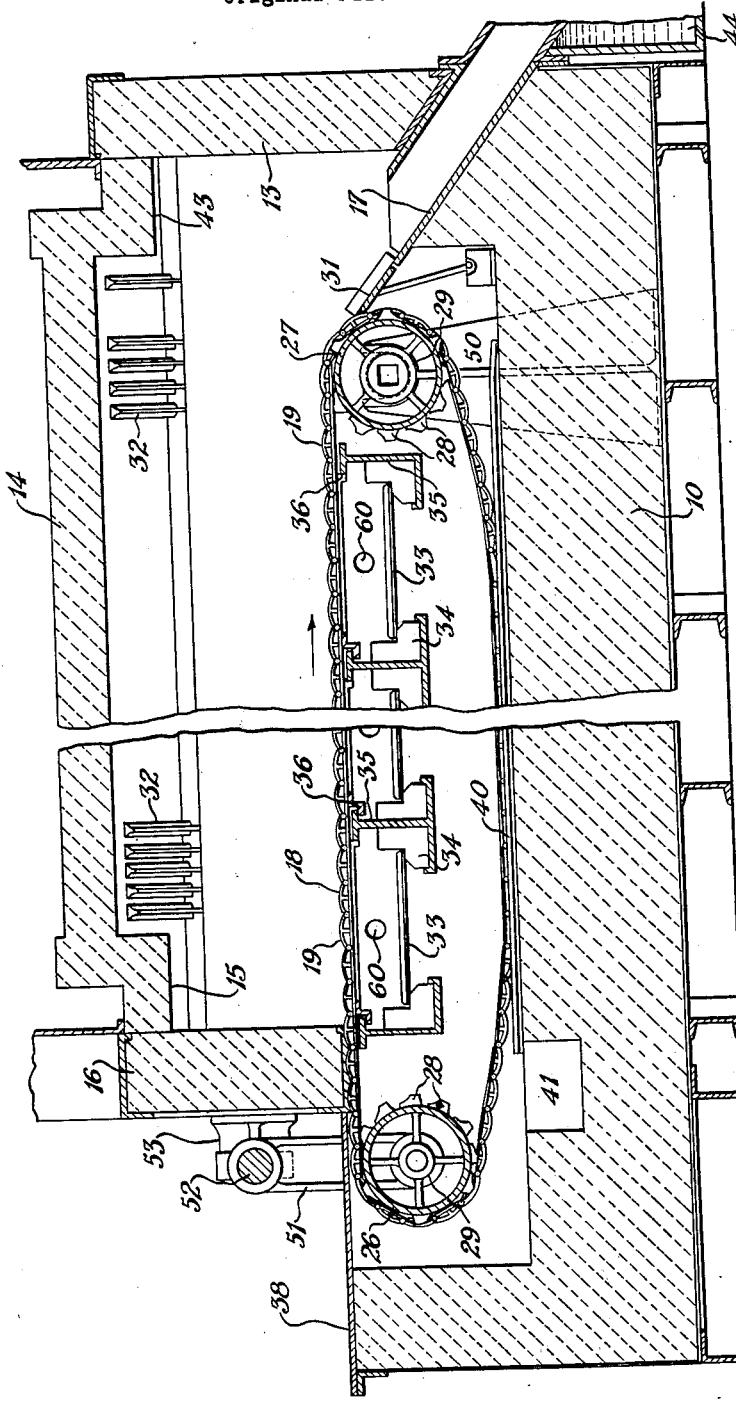

Oct. 17, 1933.  F. T. COPE ET AL  1,930,584
BELT DRIVE CONVEYER
Original Filed March 16, 1929  3 Sheets-Sheet 1

Inventors
F. T. Cope
R. C. Oyster
By Harry Frease
Attorney

Oct. 17, 1933.  F. T. COPE ET AL  1,930,584
BELT DRIVE CONVEYER
Original Filed March 16, 1929   3 Sheets-Sheet 2

Inventors
F. T. Cope
R. C. Oyster
By Harry Frease Attorney

Oct. 17, 1933. F. T. COPE ET AL 1,930,584
BELT DRIVE CONVEYER
Original Filed March 16, 1929    3 Sheets-Sheet 3
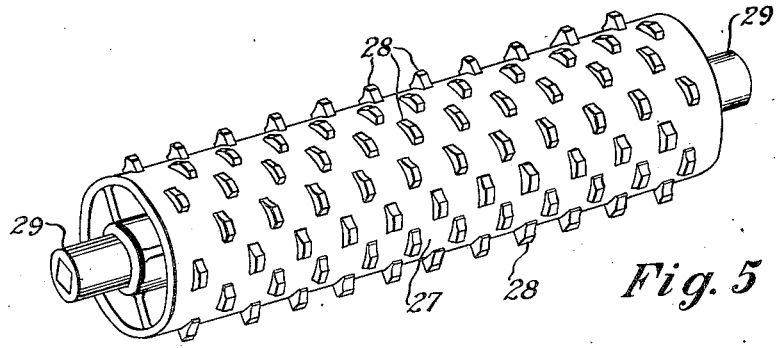
Fig. 5
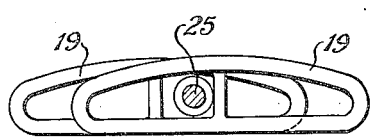
Fig. 7
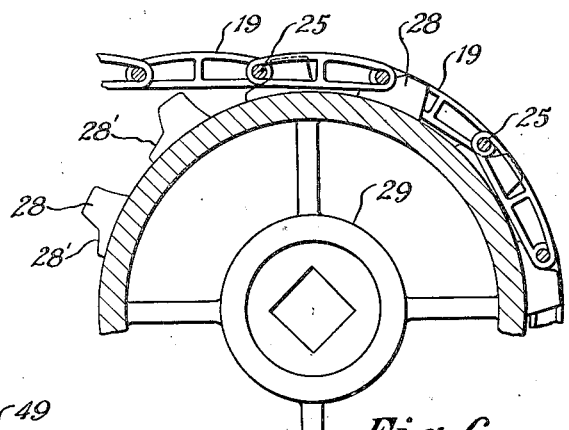
Fig. 6
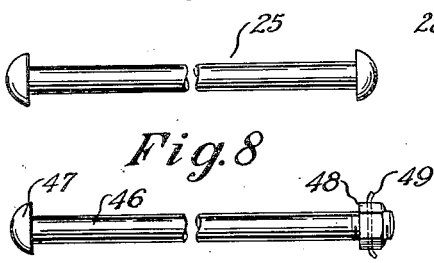
Fig. 8
Fig. 8a
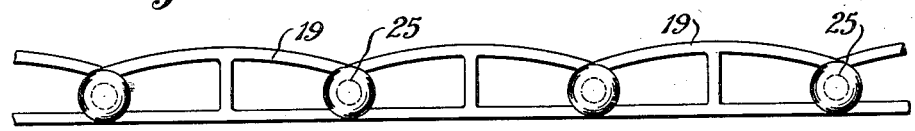
Fig. 9
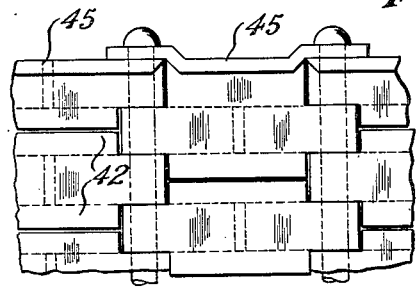
Fig. 10
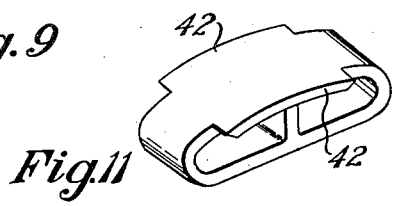
Fig. 11
Inventors
F. T. Cope
R. C. Oyster
By Harry Frease
Attorney Patented Oct. 17, 1933

1,930,584

UNITED STATES PATENT OFFICE 1,930,584

BELT DRIVE CONVEYER

Frank T. Cope and Ray C. Oyster, Salem, Ohio, assignors to The Electric Furnace Company, Salem, Ohio, a corporation of Ohio Original application March 16, 1929, Serial No. 347,706. Divided and this application November 16, 1929. Serial No. 407,618

7 Claims. (Cl. 198—189)

This invention relates to electric heat treatment furnaces wherein a moving conveyer is used to convey the objects to be heated, said conveyer being adapted to support the objects on its upper surface, carry them through the heated chamber, and discharge them at the desired point, preferably at or near the termination of the chamber.

The present application is a division of our former application, Serial No. 347,706, filed March 16, 1929 and relates more particularly to the endless belt and means for driving the same.

An object of the invention is to provide an improved type of work-carrying conveyer, improved means of supporting the conveyer, improved means of driving the conveyer, and improved means of maintaining alignment of the component parts of the conveyer.

A further object is to improve the method of applying heat in order to secure rapid and uniform heating.

Another object is to prevent loss of heat from the conveyer by causing it to travel substantially its entire length within the heated chamber and by enclosing and insulating it where it is necessary to expose it at the point where material is loaded.

Another object is to provide means whereby objects are prevented from falling from the conveyer during its travel through the chamber and means for discharging the heated objects without damage.

We use a conveyer consisting of a plurality of loop-shaped links which are assembled to form an endless conveyer of any desired width and length by the use of rods. These rods have heads, preferably formed integral with the rods, of such size that they may be thrust through the openings in the links. When the conveyer is stretched taut, however, the removal of these rods is prevented.

We make the upper or carrying surface of these links curved with a radius equal to the distance from the center of the conveyer drums or sprockets in order that the conveyer may have a smooth cylindrical surface where it travels around the sprockets.

It will be seen that such a conveyer comprises an articulated link belt of small elements and has a degree of flexibility much greater than the usual construction in which the carrying portion is composed of relatively large, substantially flat flights or plates.

It will also be seen that such a conveyer is very strong in tension because of the large number of shearing surfaces which resist failure of the conveyer.

For driving and maintaining tension in our improved conveyer we use sprockets in the form of toothed drums having teeth of substantially the shape shown in the drawings. The leading face of each tooth is formed with a portion sloped upward with respect to a line tangent to the drum and is thus made to support the end portion of a link. The rows of teeth are staggered and each row of links is supported at intervals equal to the tooth spacing, intermediate links being carried by the rods. We make the form of the tooth faces such that the center portions of the links do not bear against the drum, thereby avoiding stresses tending to bend the links.

Figure 2:
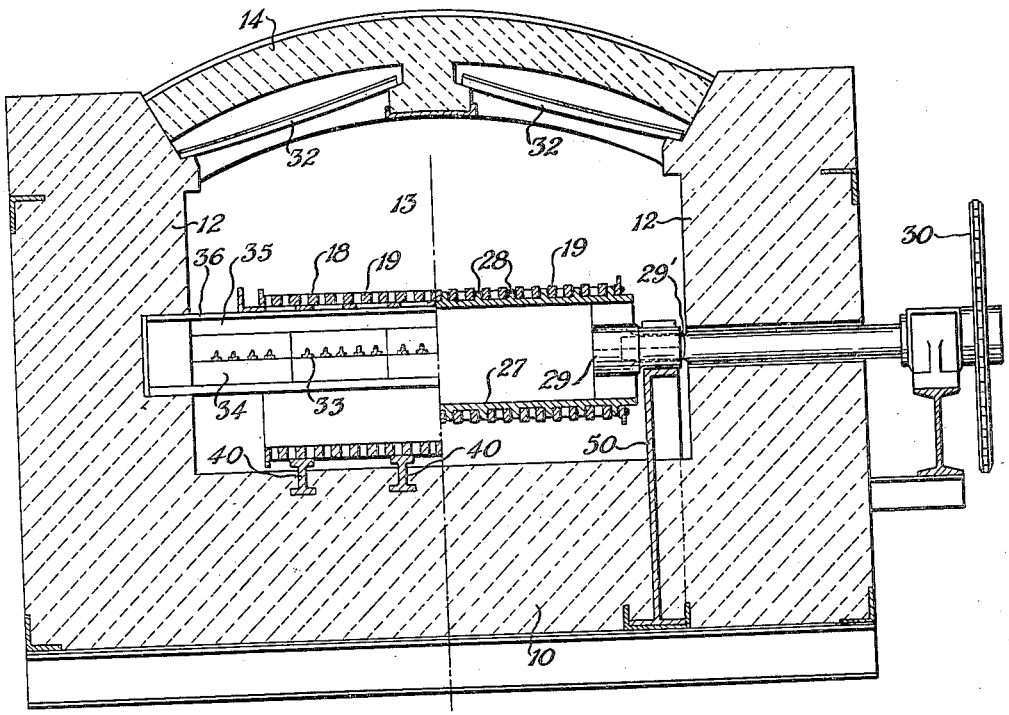
Figure 3:
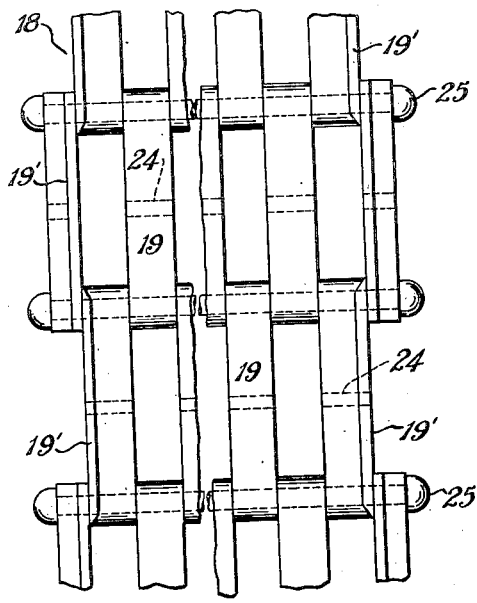
Figure 4:
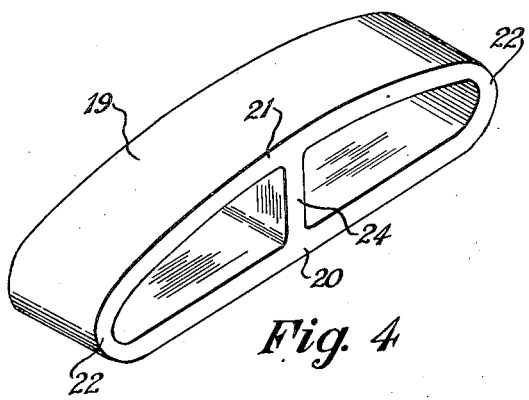

An embodiment of the invention is illustrated in the accompanying drawings, in which Figure 1 is a vertical longitudinal section through a furnace provided with the improved chain belt conveyer;

Fig. 2, a transverse vertical section through the furnace;

Fig. 3, a fragmentary plan view of a portion of the improved chain belt upon an enlarged scale;

Fig. 4, a detached perspective view of one link of the chain belt;

Fig. 5, a detached perspective view of one of the toothed drums;

Fig. 6 an enlarged fragmentary view of a portion of one toothed drum, showing the manner in which the chain belt travels over the same;

Fig. 7, a view of two adjacent links of the chain belt, showing the manner of placing a pivot rod through the same for assembling or repairing the chain;

Fig. 8, an elevation of one of the pivot rods;

Fig. 8a, a similar view of a modified form of pivot rod;

Fig. 9, an edge elevation of a portion of the chain belt;

Fig. 10, a fragmentary plan view of a modified form of conveyer belt; and

Fig. 11, a detail perspective view of one of the links with wings at its sides.

Similar numerals refer to similar parts throughout the drawings.

The furnace or kiln in which the improved conveyer is located may be of any suitable construction, comprising a refractory floor or bottom wall 10, the side walls 12, roof or arch 14, and rear doorway 43, normally closed as by the door 13.

The entrance end of the furnace may be provided with the charging opening 15, arranged to be normally closed, as by the sliding door 16, while the discharge end of the furnace may be provided with an inclined chute 17, for receiving articles from the conveyer and discharging them from the heating chamber as to a quenching tank 44.

The chute 17 may be of air-tight construction and may terminate beneath the level of the quenching fluid in the tank 44, so as to prevent cooling of the furnace by air currents.

The improved conveyer is in the form of a chain belt indicated generally at 18, and made up of a series of one-piece, seamless, open, loop-shaped links 19, substantially of the shape shown in Fig. 4, and as shown are necessarily cast or forged. Each link has a substantially flat bottom or inner wall 20 and a convexly curved upper or outer wall 21, joined at their ends by the rounded walls 22 to form a substantially elliptical loop; and said walls 20 and 21 are of such a thickness and may be braced or reinforced intermediate their ends as by the vertical web or partition wall 24, so as to be substantially inflexible under working conditions.

The upper or carrying walls of these links are curved upon a radius equal to the distance from the center of the conveyer drums or sprockets, in order that the chain belt may have a smooth cylindrical surface as it travels around the drums.

These links are located in staggered rows and connected together by the pivot rods 25, forming a chain belt of any desired width and length as best illustrated in Figs. 1 and 3.

This belt is arranged to be located over similar sprocket drums 26 and 27 located at the inlet and discharge end portions, respectively, of the furnace, each drum being provided with spaced rows of sprocket teeth 28 to coincide with the spaces between the belt links for registering engagement between the links 19 of the chain belt.

The teeth 28, upon the drums, are of substantially the shape best illustrated in Fig. 6 of the drawings. The leading face of each tooth is formed with a portion 28', sloped upward with respect to a line tangent to the periphery of the drum, for the purpose of supporting one end portion of each link as it engages with the tooth.

The rows of teeth are staggered, and each row of links is supported at intervals equal to the tooth spacing, intermediate links being carried by the rods 25. It will be seen that the teeth are so shaped that the center portions of the links do not bear against the drum, thereby avoiding stresses tending to bend the links.

For the purpose of preventing small articles from falling from the conveyer belt, side guards 19' may be formed along the edge portions of the links at each side edge of the conveyer, as shown in Fig. 3.

When small articles are to be handled, which might partially or wholly drop through the openings in a conveyer as shown in Figs. 3 and 4, a modified form of link, as shown in Figs. 10 and 11, may be employed.

This link has spaced upper and lower walls, the upper wall forming part of the outer surface of the conveyer belt, and the lower wall forming part of the inner surface thereof. The upper or outer wall of each link is provided at its sides with laterally projecting wings 42 forming an extension of the outer surface of the link so that when the links are assembled, a substantially closed carrying surface is produced upon the conveyer belt. Side guards 45, similar to the side guards 19' in Fig. 3, may be employed on the side edge links to prevent articles from falling from the conveyer.

This construction permits the use of cylindrical drums having sprocket teeth extending into the belt under the wings for engaging and supporting links intermediate the outer edges of the conveyer belt. Thus the conveyer belt may be supported and driven at closely spaced intervals across its entire width.

When links of the modified form shown in Figs. 10 and 11 are used, it will be seen that the wings prevent placing adjacent links in the position shown in Fig. 7, for the purpose of inserting the pivot rods shown in Fig. 8.

A modified form of pivot rod is therefore provided, which may be as shown in Fig. 8a, comprising a shank portion 46, an integral head 47 at one end thereof, and a removable head 48 at the other end, adapted to be held in place as by the locking pin 49.

Each sprocket drum may be provided with trunnion portions 29 adapted to be carried in suitable journals. The trunnions of drum 27 may be journaled in fixed brackets 50, and those of the drum 26 in the lower ends of swinging arms 51, which are fixed to shaft 52, carried by the brackets 53.

The shaft 52 may be operatively associated with any suitable means such as a counterweight for maintaining tension in the conveyer.

For driving the drum 27 we may form one of the trunnion portions 29 with a square hole extending therethrough and adapted to operatively engage a squared end portion of the driving shaft 29'. This shaft may extend through the side wall of the furnace, as in Fig. 2, and have fixed thereon a sprocket wheel, or the like, as indicated at 30, for connection to a driving chain, or other means of driving the conveyer in the direction of the arrow shown in Fig. 1.

The square hole in the trunnion 29, and the squared end of the shaft 29', form a wabbler coupling which permits misalignment of the drum 27 and the shaft 29', and also permits the removal of the shaft or drum without tearing the furnace apart.

Articles to be heated or treated in the furnace may be placed upon the charging plate 38 at the entrance or charging end of the furnace, the door 16 being first raised sufficiently to permit the articles to pass beneath the same as they are pushed into the furnace and upon the belt.

This construction provides an insulated enclosure for the tail sprocket drum, at the same time permitting for convenient loading of articles or material to be treated, while retaining the heat in the conveyer.

As the articles upon the belt reach the discharge end portion of the furnace, they will be stripped or removed from the conveyer belt by means of the stripper plate 31, which may be located in alignment with the discharge chute 17, terminating at a point adjacent to the sprocket wheel 26 and floating upon the chain belt as shown in Fig. 1.

For the purpose of heating the material upon the belt, electric resistors 32 may be supported from the roof of the furnace, and other resistors 33 may be located between the upper and lower strands of the conveyer belt, being supported as upon the insulation or refractory blocks 34 mounted upon inverted T-shaped or L-shaped beams 35 supported from the side walls 12, and in turn supporting the members 36 upon which the upper strand of the conveyer chain slides.

With this arrangement it will be seen that resistors may be located or disposed both above and below the material or articles carried upon the conveyer belt, thus uniformly heating the articles as they pass through the furnace or kiln.

Thus a partition structure is provided between the drums and between the upper and lower strands of the chain belt which forms a combined resistor supporting and chain supporting means. This being an open partition structure, scale which drops from the articles or material on the chain belt may pass through the openings in the links and fall through the similar openings in the lower strand of the chain.

A metal return supporting guide 40 may be located upon the floor of the furnace for the lower strand of the chain to ride upon, and a scrap pocket 41 may be located at the end of this guide to receive the scale and dirt which is carried back by the chain. Any suitable means may be provided for cleaning out this pocket.

As shown in Figs. 10 and 11, each link of the chain may be provided with wings 42, at its sides, thus forming practically a closed chain, especially adapted for conveying very small articles.

The sprocket drums, as well as the chain belt, may be made of suitable heat resisting metal to permit the same to stand the high temperatures to which they are subjected. The particular link construction of the chain belt provides sufficient flexibility of the same and also makes a construction which is easily operated by means of the sprocket drums for passing the material through the furnace while the stripper plate automatically removes the treated articles from the conveyer belt and discharges them through the chute to the exterior of the furnace.

For the purpose of cleaning any deposit of scale and dirt from the resistors and hangers, openings, as shown at 60, may be provided in the side wall of the furnace to permit an air pipe to be inserted therethrough and turned to any desired position to blow the scale and dirt from these parts.

In the operation of a heat treating furnace embodying the improved conveyer belt, the upper conveying portion of the longitudinally and laterally continuous endless belt, which extends around and conforms to the shape of the drums at each end of the furnace, forms a continuously moving floor or hearth upon which small metal parts or articles fed into the furnace through the charging opening, are distributed and disposed in a comparatively thin longitudinally and laterally continuous mass or layer, and permits the individual pieces to be uniformly heated, not only with respect to each other, but with respect to each piece, by the heating means located above and below the same.

It is impossible to obtain such a uniformity of temperature by heating small parts in segregated masses or batches in trays or troughs, because of the size of the mass; and the consumption of heat required to raise and maintain the temperature of the containers, decreases the efficiency of the furnace.

Moreover, the amount of oxidation or scale formation is a function of the length of time the parts are exposed to oxidizing influence, and in the furnace, the application of heat is applied so directly from above and below the continuously moving mass or layer of small parts, and they are heated to the critical temperature so quickly, that no excessive oxidation or scale is formed before they are delivered into the quenching medium.

In a furnace embodying the improved conveyer belt, the small parts are disposed in a continuously moving comparatively thin mass or layer, and are given a gradually applied uniform heat treatment with an adjustable heating cycle under full control, and without the formation of scale or objectionable oxidation, and the small parts are delivered individually to a quenching tank chute without any distortion or nicking, all with the maximum efficiency and a minimum amount of labor and consumption of electric current for obtaining the desired quality of product.

And finally, a heat treating furnace having the present improved conveyer belt, has successfully supplied a need and a demand which has existed for many years for a type of furnace which would successfully handle and heat treat small parts, and would produce one hundred percent of net material; and that problem was never solved until the new type of furnace illustrated and described herein was devised, and the improved functions and results set forth herein were never before obtained in any prior furnace.

We claim:

1. In a heat treating furnace, a plurality of spaced rows of integral one-piece seamless open links pivotally connected together to form a flexible articulated conveyer belt, each link including a flat inner wall, a curved outer wall, and a partition wall extending between the outer and inner walls, all of the walls having a uniformly substantial thickness, whereby each link is rendered substantially inflexible.

2. In a heat treating furnace, a plurality of spaced rows of integral seamless loop-shaped inflexible links pivotally connected together to form a flexible articulated conveyer belt, each link including a flat inner wall, a convexly curved outer wall spaced therefrom, and a partition wall extending between the inner and outer walls at the central portions thereof.

3. In a heat treating furnace, a flexible articulated conveyer belt including integral seamless open inflexible links pivotally connected together, and each link including a flat inner wall and a convexly curved outer wall spaced therefrom.

4. In a heat treating furnace, a plurality of spaced rows of integral one-piece seamless inflexible links pivotally connected together to form a flexible, articulated conveyer belt, a sprocket drum for driving the conveyer belt, and each link including a flat inner wall and an outer wall curved upon a radius from the center of the sprocket drum.

5. In a heat treating furnace, a plurality of spaced rows of integral one-piece seamless open links pivotally connected together to form a flexible articulated conveyer belt, a sprocket drum for driving the conveyer belt, and each link including a flat inner wall and an outer wall curved upon a radius from the center of the sprocket drum, said inner and outer walls having a uniformly substantial thickness whereby each link is rendered substantially inflexible.

6. In a heat treating furnace, a plurality of spaced rows of integral one-piece seamless loop-shaped links pivotally connected together to form a flexible articulated conveyer belt, each link including a flat inner wall, a curved outer wall, the inner and outer walls being connected at their ends by rounded end walls, and all of the walls having a uniformly substantial thickness whereby each link is rendered substantially inflexible.

7. In a heat treating furnace, a plurality of spaced rows of integral one-piece seamless open inflexible links pivotally connected together to form a flexible articulated conveyer belt, each link including spaced inner and outer walls connected at their ends by rounded end walls, and a partition wall extending between the inner and outer walls at the central portions thereof.

FRANK T. COPE.
RAY C. OYSTER.